(12) United States Patent
Nomura

(10) Patent No.: US 11,561,103 B2
(45) Date of Patent: Jan. 24, 2023

(54) LANE NETWORK DATA GENERATION APPARATUS AND STORAGE MEDIUM

(71) Applicant: DENSO CORPORATION, Kariya (JP)

(72) Inventor: Tomoo Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 10 days.

(21) Appl. No.: 16/876,889

(22) Filed: May 18, 2020

(65) Prior Publication Data

US 2020/0278210 A1 Sep. 3, 2020

Related U.S. Application Data

(63) Continuation of application No. PCT/JP2018/035383, filed on Sep. 25, 2018.

(30) Foreign Application Priority Data

Dec. 4, 2017 (JP) .............................. JP2017-232591

(51) Int. Cl.
G01C 21/32 (2006.01)
B60W 60/00 (2020.01)
G01C 21/36 (2006.01)

(52) U.S. Cl.
CPC ......... *G01C 21/32* (2013.01); *B60W 60/0025* (2020.02); *G01C 21/3691* (2013.01)

(58) Field of Classification Search
CPC .... G01C 21/28–32; G01C 21/38–3867; G01C 21/3691
See application file for complete search history.

(56) References Cited

U.S. PATENT DOCUMENTS

| 9,494,438 | B1* | 11/2016 | Ichinokawa | G01C 21/30 |
| 2013/0328924 | A1* | 12/2013 | Arikan | G01C 21/32 345/629 |
| 2014/0244161 | A1* | 8/2014 | Strassenburg-Kleciak | G01C 21/3635 701/436 |
| 2014/0358322 | A1* | 12/2014 | Ibrahim | G05D 1/0055 701/1 |

(Continued)

FOREIGN PATENT DOCUMENTS

| JP | 2006023958 A | 1/2006 |
| JP | 5194452 B2 | 5/2013 |
| JP | 6197393 B2 | 9/2017 |

OTHER PUBLICATIONS

"Manual for generating a numerical topographic map data using a measurement system with a travelling survey vehicle"; Geographic Survey Institute in Ministry of Land, Infrastructure and Transport, May 2012 (80 pages) (partial translation).

*Primary Examiner* — Aaron L Troost
(74) *Attorney, Agent, or Firm* — Harness, Dickey & Pierce, P.L.C.

(57) ABSTRACT

An all-one-way network data for autonomous driving is generated according to traffic information of a road data included in a navigation map data. The lane network data for autonomous driving is generated based on the all-one-way network data according to information of a numerical number of lanes in the road data. A virtual lane boundary data is generated based on the all-one-way network data. A position of the lane network data and a position of the virtual lane boundary data are corrected according to a basic road map data and an aerial photograph data.

8 Claims, 17 Drawing Sheets

(56) References Cited

U.S. PATENT DOCUMENTS

2015/0308836 A1* 10/2015 Alvarez Tabio Togores ............... G06T 11/203
    701/400
2015/0354976 A1* 12/2015 Ferencz ............... G06K 9/3241
    382/104

* cited by examiner

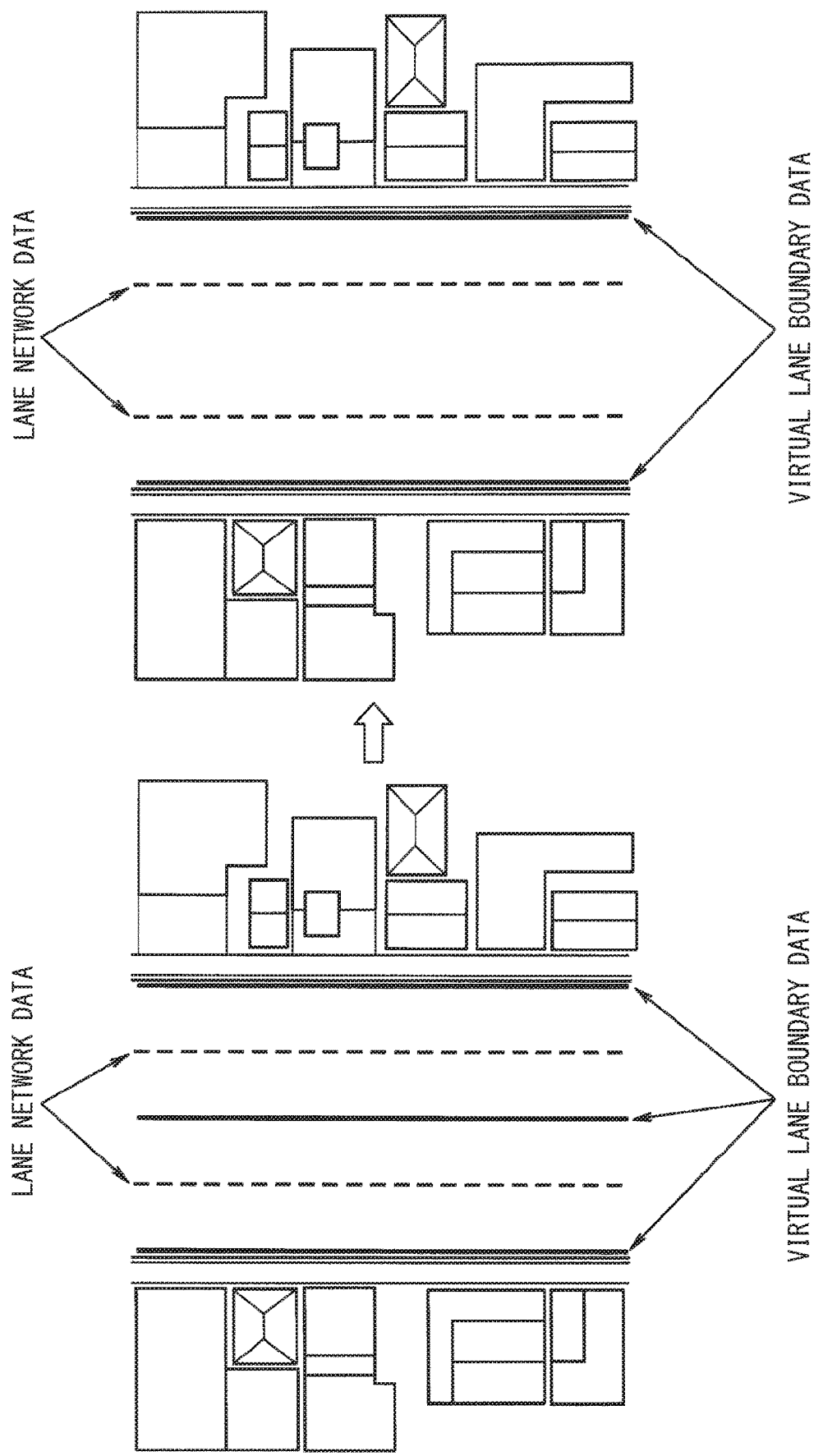

LANE NETWORK DATA GENERATION APPARATUS AND STORAGE MEDIUM

CROSS REFERENCE TO RELATED APPLICATIONS

The present application is a continuation application of International Patent Application No. PCT/JP2018/035383 filed on Sep. 25, 2018, which designated the U.S. and claims the benefit of priority from Japanese Patent Application No. 2017-232591 filed on Dec. 4, 2017. The entire disclosures of all of the above applications are incorporated herein by reference.

TECHNICAL FIELD

The present disclosure relates to a lane network data generation device and a storage medium.

BACKGROUND

There is a method of measuring the shape and position of a road with high accuracy using a dedicated moving vehicle and generating lane network data for autonomous driving. This method may be expensive in general because it requires enormous work by expensive sensors and humans. Therefore, lane network data is generated only in a limited area such as an expressway or a limited highway. It is not easy to generate nationwide lane network data including general roads using the above-described method.

SUMMARY

According to an example embodiment, an all-one-way network data for autonomous driving is generated according to traffic information of a road data included in a navigation map data. The lane network data for autonomous driving is generated based on the all-one-way network data according to information of a numerical number of lanes in the road data. A virtual lane boundary data is generated based on the all-one-way network data. A position of the lane network data and a position of the virtual lane boundary data are corrected according to a basic road map data and an aerial photograph data.

BRIEF DESCRIPTION OF THE DRAWINGS

The above and other objects, features and advantages of the present disclosure will become more apparent from the following detailed description made with reference to the accompanying drawings. In the drawings:

FIG. 17 is a diagram (part 4) illustrating a feature of correcting the position of lane network data.

DETAILED DESCRIPTION

Figure 1:
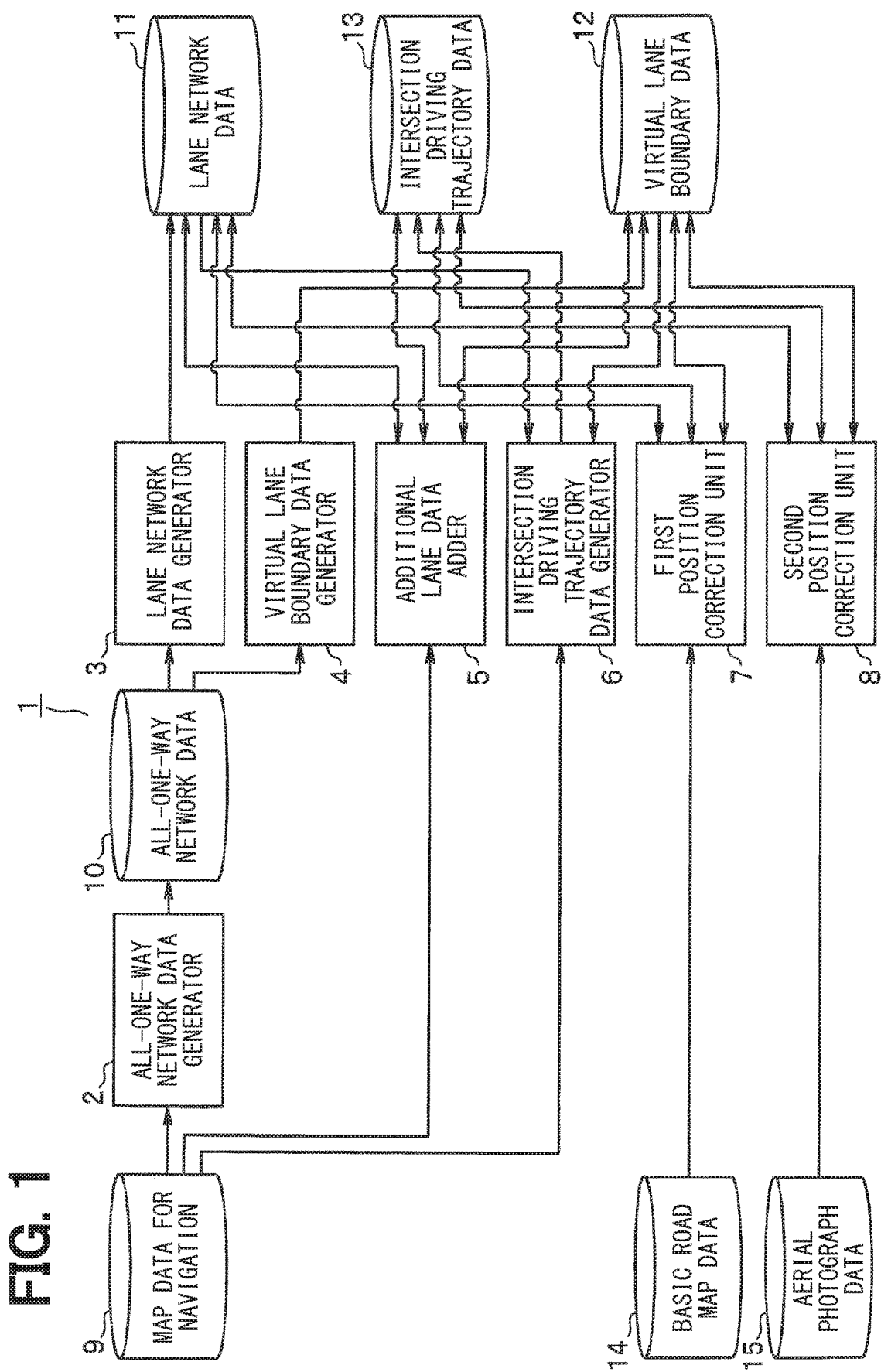
FIG. 1 is a functional block diagram showing one embodiment.
Figure 2:
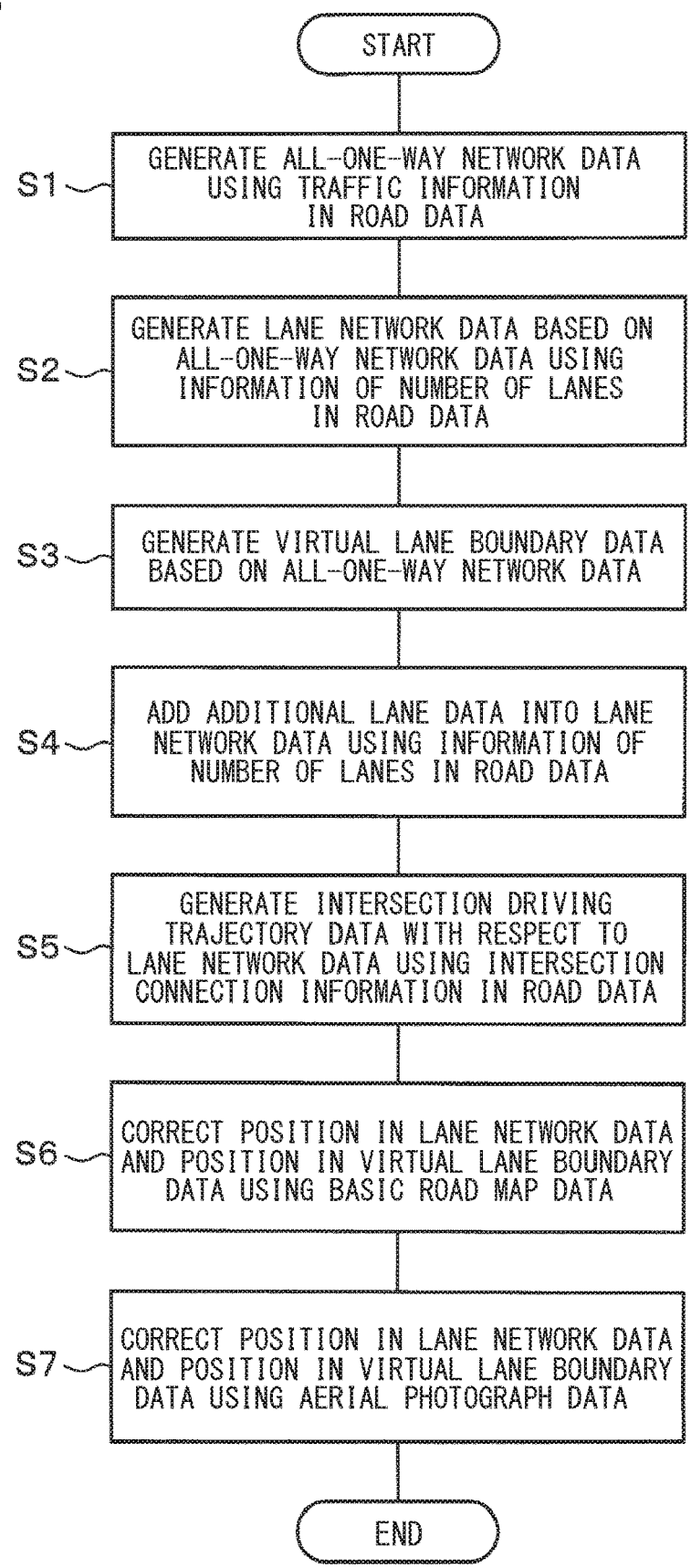
FIG. 2 is a flowchart.

A conceivable technique discloses a method of collecting front images captured by a camera mounted on a general vehicle and generating lane network data without using a dedicated moving vehicle. Further, for example, another conceivable technique discloses a technique for improving the accuracy of navigation map data using aerial photograph data. Further, for example, another conceivable technique discloses a method of recognizing a road center line or a road outside line using aerial photograph data, correcting the position of the lane network data, and improving the accuracy of the lane network data.

The above method provides to expand the range in which the lane network data is generated. However, the method is similar to the method using a dedicated moving vehicle in view of the feature that it is necessary to go to an actual place along a road and to photograph the state of the road. Therefore, there may be a difficulty that the lane network data cannot be generated for a road that has not been visited. Further, the above other method may include a difficulty that the accuracy of the map data for navigation may be only improved, and the accuracy of the lane network data may not be improved. Furthermore, although the above other method can provide to eliminate the necessity to go to the actual place, the aerial photograph may be unclear or vehicles on the road may be photographed, so that the road center line and the road outside line may not be captured. Thus, in this case, there may be a difficulty that the accuracy of the aerial photograph data decreases and the accuracy of the lane network data cannot be increased.

A lane network data generation device and a storage medium are provided such that it can appropriately generate high-accuracy lane network data for autonomous driving without going to an actual place.

According to an example embodiment of the present disclosure, the all-one-way network data generation unit generates all-one-way network data using the traffic information of the road data included in the navigation map data. The lane network data generation unit generates lane network data for autonomous driving from the all-one-way network data using the information of the number of lanes in the road data. The virtual lane boundary data generation unit generates virtual lane boundary data from the all-one-way network data. The position correction unit corrects the position in the lane network data and the position in the virtual lane boundary data using the basic road map data and the aerial photograph data.

That is, different from the conceivable method in which the position of the lane network data is corrected using only the aerial photograph data, the correction is performed using the basic road map data in addition to the aerial photograph data. By using the basic road map data, the information about lanes is not acquired, but it is possible to roughly obtain the total width of all lanes and roughly estimate the width of each lane, and roughly correct the position of the lane network data. Further, by using the aerial photograph data, the position of the lane network data can be corrected in detail. This makes it possible to appropriately generate high-accuracy lane network data for autonomous driving while avoiding to go to the actual place.

Hereinafter, an embodiment will be described with reference to the drawings. As shown in FIG. 1, a lane network data generation apparatus 1 is a generation device that generates lane network data for autonomous driving, and includes an all-one-way network data generator 2, a lane network data generator 3, a virtual lane boundary data generator 4, an additional lane data adder 5, an intersection driving trajectory data generator 6, a first position correction unit 7, and a second position correction unit 8. The lane network data for autonomous driving is data indicating a trajectory when the vehicle travels under autonomous driving operation. These functional blocks are provided by a microcomputer having a CPU (Central Process Unit), a ROM (Read Only Memory), a RAM (Random Access Memory), and an I-O (Input-Output) device. The microcomputer executes a process corresponding to the computer program by performing the computer program stored in the non-transitory tangible storage medium, and controls the overall operations of the lane network data generation apparatus 1. The computer program executed by the microcomputer include a lane network data generation program.

The all-one-way network data generator 2 reads the navigation map data stored in the navigation map data storage 9, and generates the all-one-way network data using the traffic information of the road data included in the read navigation map data. The traffic information is information indicating whether the traffic is one-way or two-way. After generating the all-one-way network data, the all-one-way network data generator 2 stores the generated all-one-way network data in the all-one-way network data storage 10.

The lane network data generator 3 reads the all-one-way network data stored in the all-one-way network data storage 10, and generates the lane network data from the read all-one-way network data using the number-of-lanes information of the road data included in the navigation map data. The number-of-lanes information is information indicating the number of lanes. After generating the lane network data, the lane network data generator 3 stores the generated lane network data in the lane network data storage 11.

The virtual lane boundary data generator 4 reads the all-one-way network data stored in the all-one-way network data storage 10, and generates the virtual lane boundary data from the read all-one-way network data. The virtual lane boundary data is data indicating a virtual boundary of the lane network data. When generating the virtual lane boundary data, the virtual lane boundary data generator 4 stores the generated virtual lane boundary data in the virtual lane boundary data storage 12.

The additional lane data adder 5 reads the navigation map data stored in the navigation map data storage 9 and the lane network data stored in the lane network data storage 11. The additional lane data adder 5 adds the additional lane data to the lane network data using the lane type information of the road data included in the navigation map data. The lane type information is information indicating whether the lane is a normal lane or an additional lane. The additional lane is a lane temporarily increased mainly before an intersection. When the additional lane data is added to the lane network data, the additional lane data adder 5 reflects information about the added additional lane data on the lane network data stored in the lane network data storage 11. Further, the additional lane data adder 5 reflects the information about the added additional lane data on the virtual lane boundary data stored in the virtual lane boundary data storage 12 and the intersection driving trajectory data stored in the intersection driving trajectory data storage 13.

The intersection driving trajectory data generator 6 reads the navigation map data stored in the navigation map data storage 9 and the lane network data stored in the lane network data storage 11. The intersection driving trajectory data generator 6 generates the intersection driving trajectory data using the intersection connection information of the road data included in the navigation map data with respect to the lane network data. The intersection connection information is information indicating a connection manner of the intersection. When generating the intersection driving trajectory data with respect to the lane network data, the intersection driving trajectory data generator 6 stores the generated intersection driving trajectory data in the intersection driving trajectory data storage 13. The intersection driving trajectory data generator 6 reflects the information relating to the generated intersection driving trajectory data on the lane network data stored in the lane network data storage 11 and the virtual lane boundary data stored in the virtual lane boundary data storage 12.

The first position correction unit 7 reads the basic road map data stored in the basic road map data storage 14, the lane network data stored in the lane network data storage 11, and the virtual lane boundary data stored in the virtual lane boundary data storage 12. The basic road map data stored in the basic road map data storage 14 is, for example, digitized basic road map data issued by the Geospatial Information Authority of Japan.

The first position correction unit 7 corrects the position of the lane network data and the position of the virtual lane boundary data by using the road edge information and the road component line information of the read basic road map data. The road edge information is information indicating the range of the road, and the road component line information is information indicating the presence of a sidewalk, a center median strip, or the like within the range of the road. When the first position correction unit 7 corrects the position of the lane network data and the position of the virtual lane boundary data, the first position correction unit 7 reflects the corrected information relating to the position of the lane network data on the lane network data stored in the lane network data storage 11. The first position correction unit 7 reflects the corrected information about the virtual lane boundary data on the virtual lane boundary data stored in the virtual lane boundary data storage 12. The first position correction unit 7 also reflects the information about the corrected position of the lane network data and the corrected position of the virtual lane boundary data on the intersection driving trajectory data stored in the intersection driving trajectory data storage 13.

The second position correction unit 8 reads the aerial photograph data stored in the aerial photograph data storage 15, the lane network data stored in the lane network data storage 11, and the virtual lane boundary data stored in the virtual lane boundary data storage 12. The aerial photograph data stored in the aerial photograph data storage 15 is, for example, digitized data of the image by photographing a ground with a camera mounted on an aircraft.

The second position correction unit 8 corrects the position of the lane network data and the position of the virtual lane boundary data using the paint information of the read aerial photograph data. When the second position correction unit 8 corrects the position of the lane network data and the position of the virtual lane boundary data, the second position correction unit 8 reflects the corrected information relating to the position of the lane network data on the lane network data stored in the lane network data storage 11. The second position correction unit 8 reflects the corrected information about the virtual lane boundary data on the virtual lane boundary data stored in the virtual lane boundary data storage 12. The second position correction unit 8 also reflects the information about the corrected position of the lane network data and the corrected position of the virtual lane boundary data on the intersection driving trajectory data stored in the intersection driving trajectory data storage 13.

A function of the above configuration will be described with reference to FIGS. 2 to 17.

The lane network data generation apparatus 1 starts executing the lane network data generation process when the start event of the lane network data generation process is established. Hereinafter, the process executed by each functional block in the lane network data generation apparatus 1 will be described.

Figure 3:
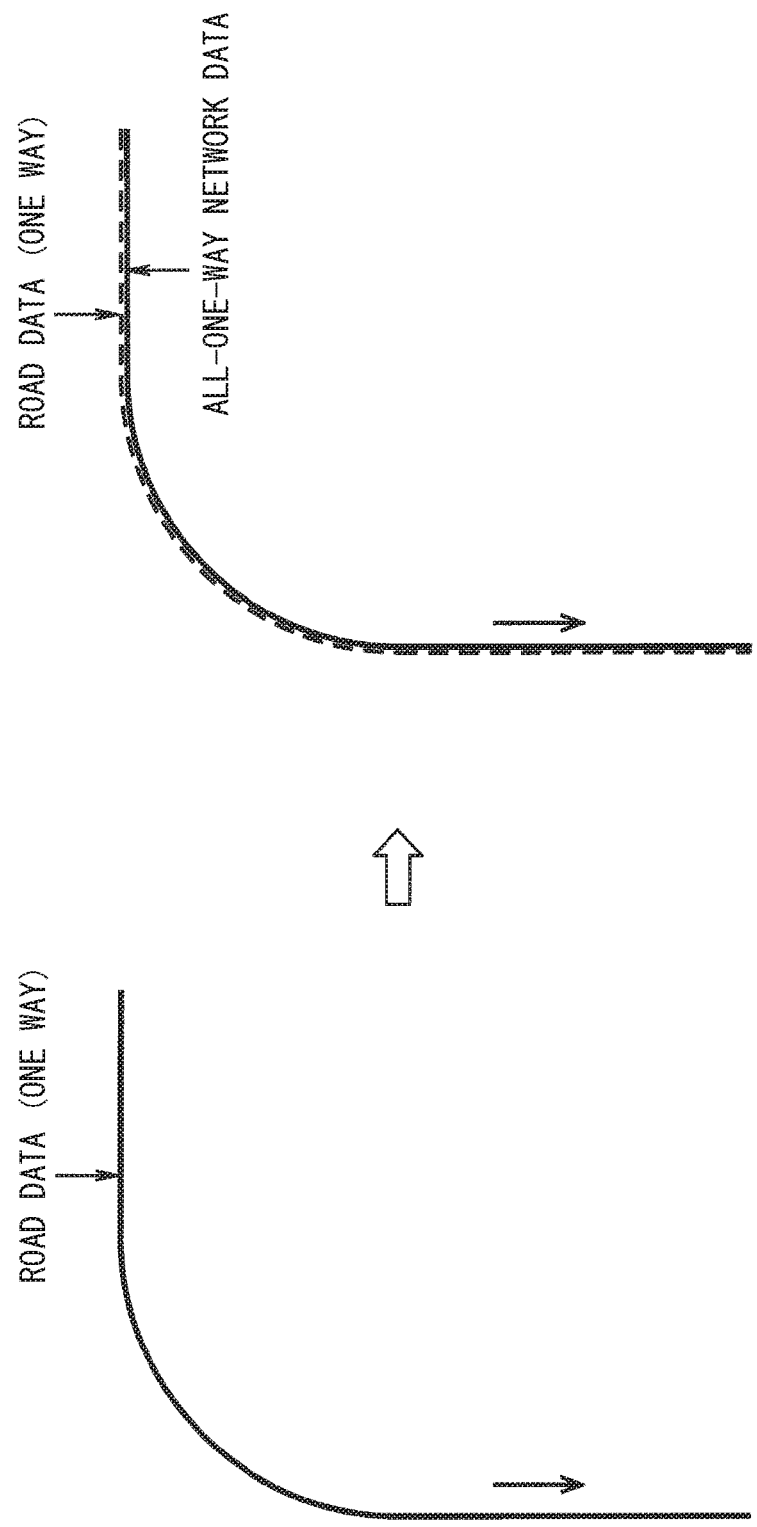
FIG. 3 is a diagram (part 1) illustrating a feature of generating all-one-way network data.

First, the all-one-way network data generator 2 generates the all-one-way network data using the traffic information of the road data included in the navigation map data (at S1, corresponding to an all-one-way network data generation procedure). That is, the all-one-way network data generator 2 determines whether the road data indicates one-way or two-way. When determining that the road data indicates one-way, the all-one-way network data generator 2 does not process the road data represented by the single line as it is, as shown in FIG. 3, and generates the all-one-way network data.

Figure 4:
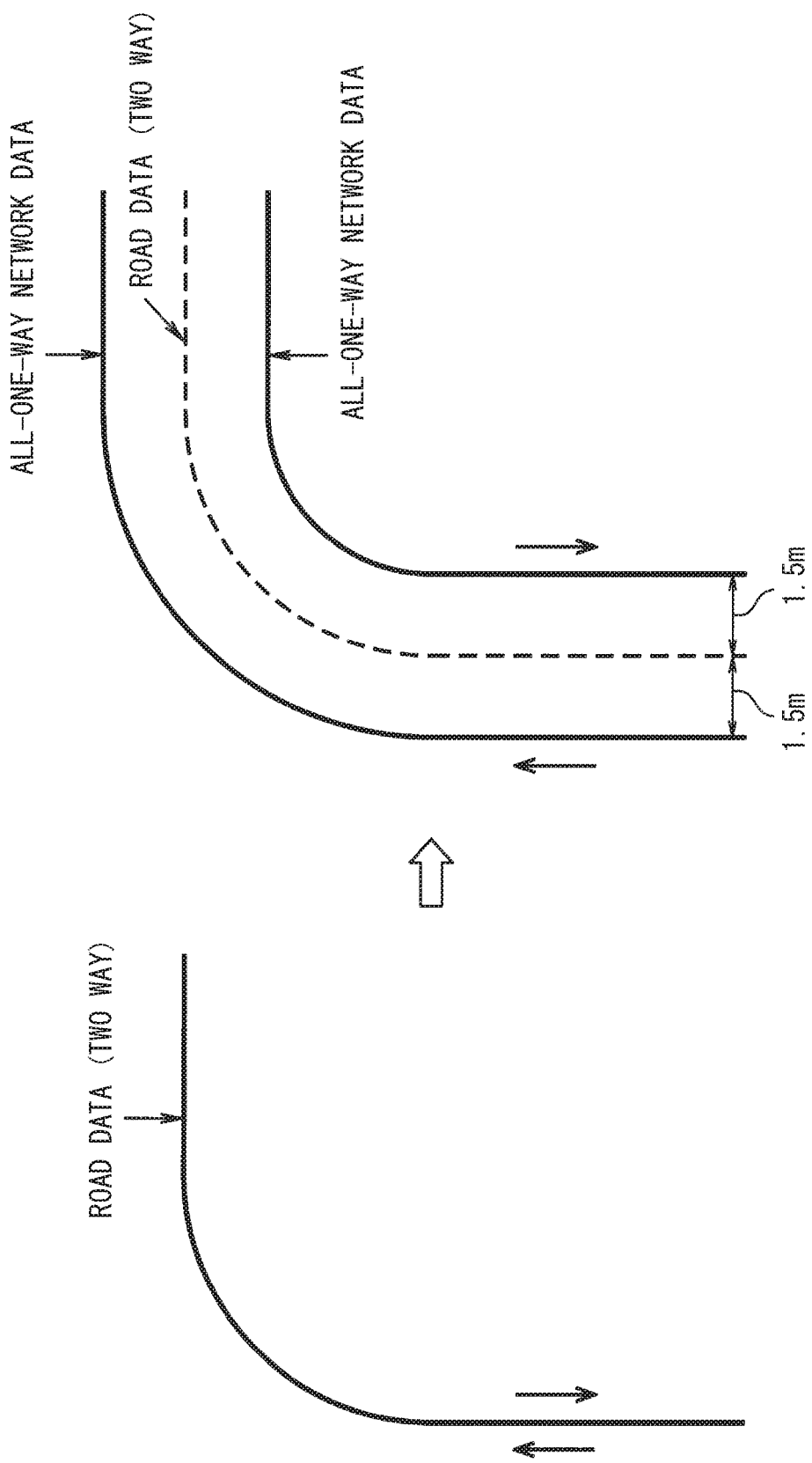
FIG. 4 is a diagram (part 2) illustrating a feature of generating all-one-way network data.

When determining that the road data indicates two-way traffic, the all-one-way network data generator 2 separates the road data represented by the single line into an upward direction line and a downward direction line, as shown in FIG. 4, and duplicates the single line into two lines to generate the all-one-way network data. In this case, the all-one-way network data generator 2 provides to set the original road data at a center position and to set the all-one-way network data at a position shifted from the original road data in parallel to the original road data by a predetermined distance (for example, 1.5 meters) on both left and right sides of the road data. The all-one-way network data generator 2 provides to set the all-one-way network data with a driving direction on the left side with respect to the direction of the road data when a left-hand traffic system is established in an area, and to set the all-one-way network data with a driving direction on the right side with respect to the direction of the road data when a right-hand traffic system is established in an area. The all-one-way network data generator 2 simply shifts a straight line section in parallel to the original road data on both sides of the road data in a case where the original road data indicates the straight line section. The all-one-way network data generator 2 executes a process for setting the distance between the road data and each line of the all-one-way network data including the upward direction line and the downward direction line to be equal to each other in addition to the process for shifting the curve section of the all-one-way network data in parallel to the original road data on both sides of the road data in a case where the original road data indicates the curve section.

Figure 5:
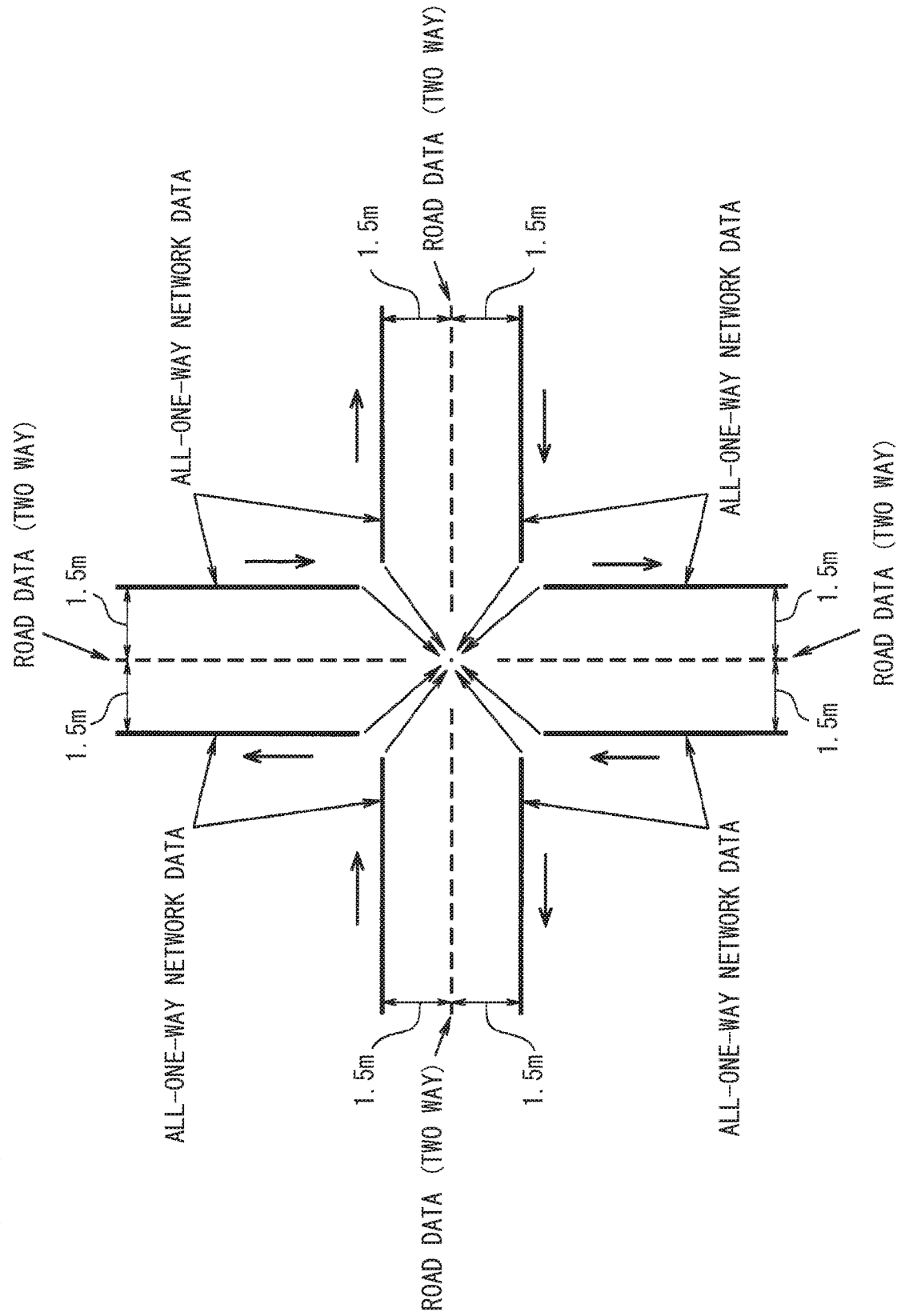
FIG. 5 is a diagram showing a connection between all-one-way network data and an intersection.

In the road data, the road is represented by a single line, and the intersection is represented by a single point. Therefore, four lines at the crossroad intersection are connected to the single point of the intersection. Therefore, as shown in FIG. 5, it is necessary for the all-one-way network data generator 2 to execute the process for editing a part of the intersection when duplicating the road data represented by the single line into two lines. Only information indicating to which intersection the one-way network data is connected is stored. In addition, the all the one-way network data generator 2 stores an attribute that the road is a special road when the driving direction of the road changes depending on the time zone in a case where the road data represented by the single line is duplicated into two lines.

Next, the lane network data generator 3 generates the lane network data from all-one-way network data using the number-of-lanes information of the road data included in the navigation map data (at S2, corresponding to a lane network data generation procedure). That is, the lane network data generator 3 copies the all-one-way network data according to the number of lanes, and sets the lane network data at a position shifted by a predetermined distance (for example, 3 meters). When the road data includes width information, the lane network data generator 3 may calculate the distance for each lane based on the width information.

Figure 6:
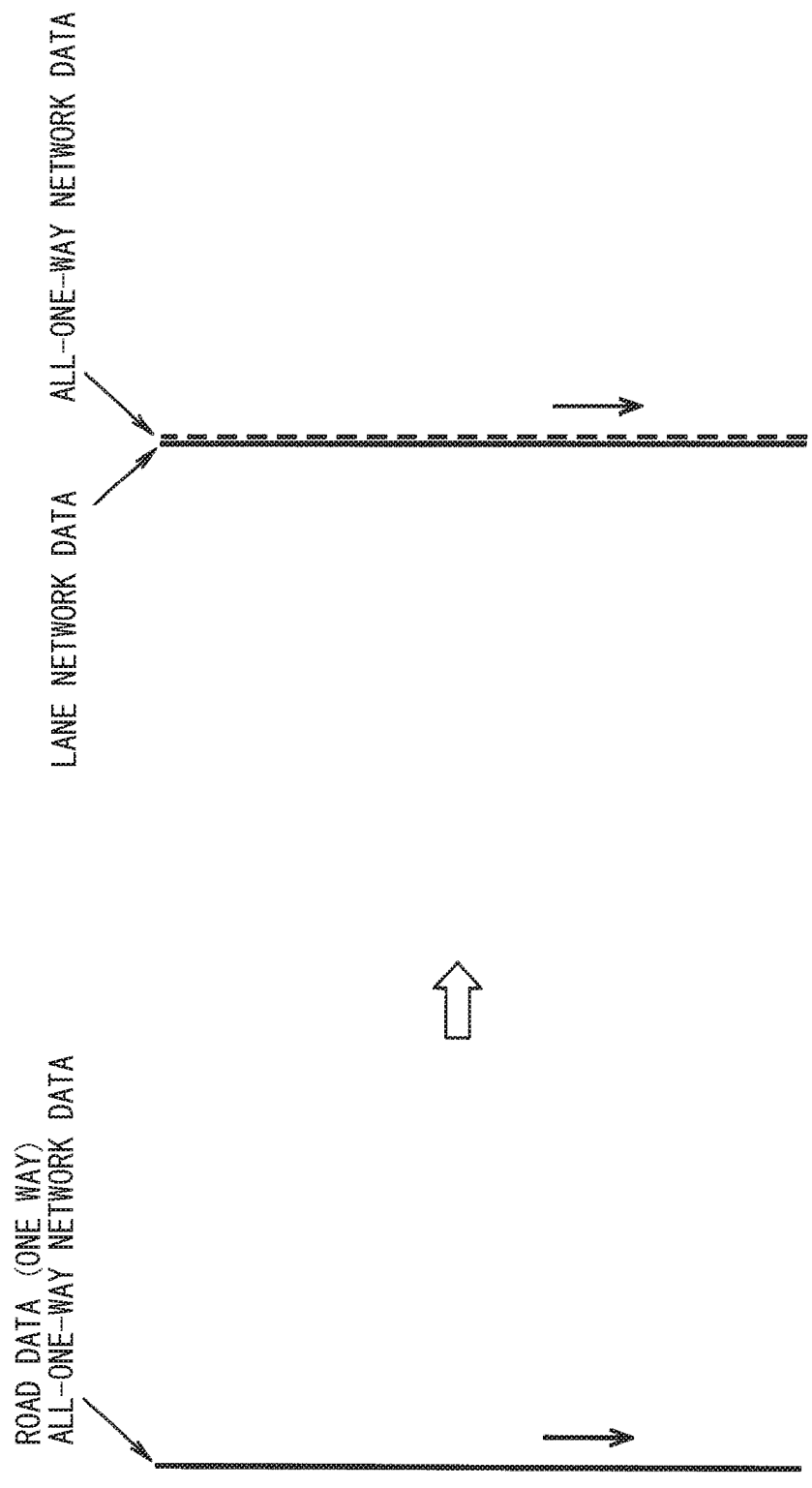
FIG. 6 is a diagram (part 1) illustrating a feature of generating lane network data.
Figure 7:
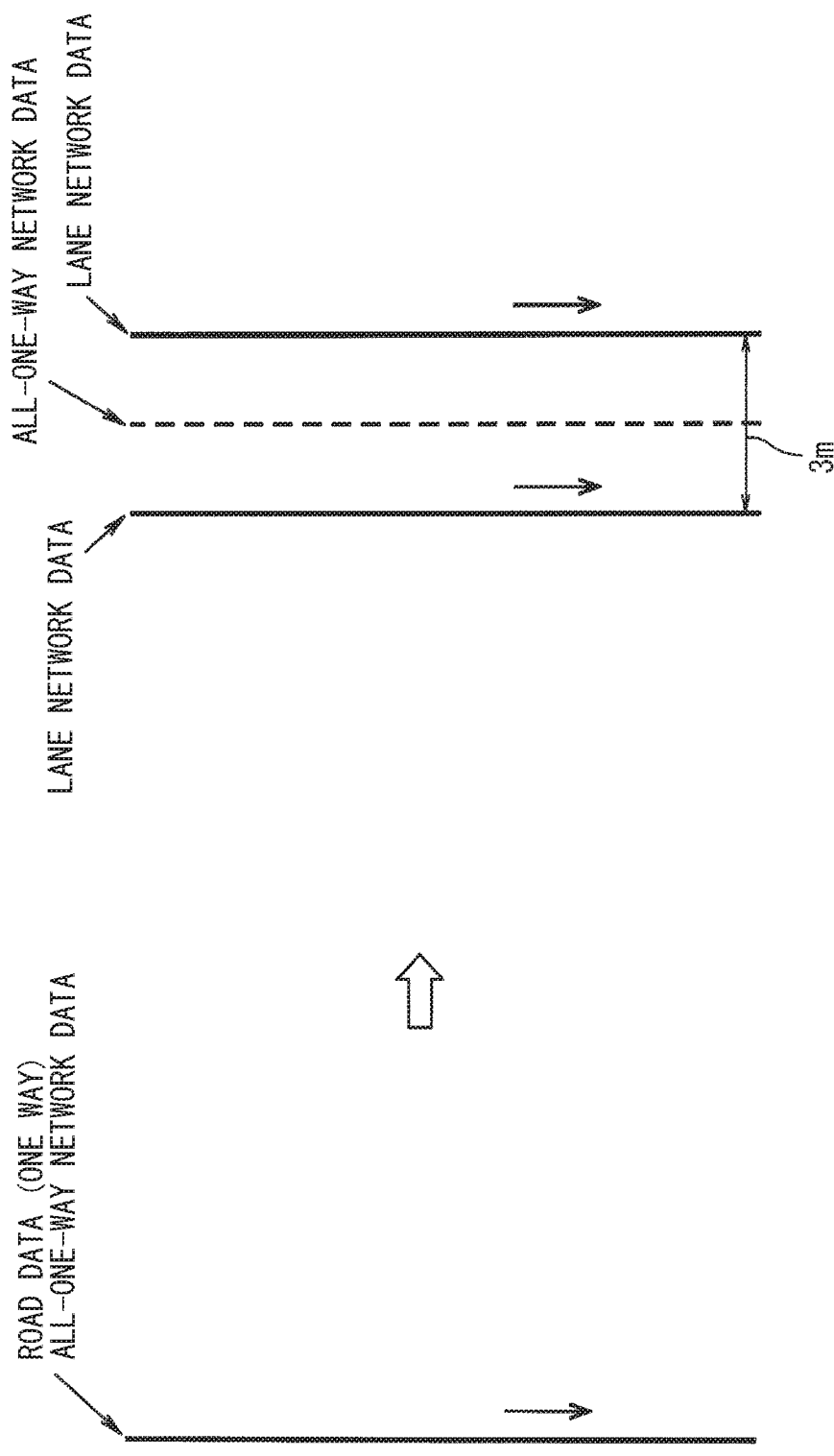
FIG. 7 is a diagram (part 2) illustrating a feature of generating lane network data.

The lane network data generator 3 sets the lane network data depending on a feature whether the data is the all-one-way network data not prepared by duplicating the road data or the all-one-way network data prepared by duplicating the road data. That is, as shown in FIGS. 6 and 7, the lane network data generator 3 sets the lane network data so as to arrange the position of the road data at the center when determining that the original road data indicates one-way and the all-one-way network data that is not prepared by duplicating the road data. When the number of lanes is "1", the lane network data generator 3 sets the lane network data at the same position as the all-one-way network data as shown in FIG. 6. When the number of lanes is "2", the lane network data generator 3 sets the lane network data at a position shifted from the all-one-way network data as shown in FIG. 7.

Figure 8:
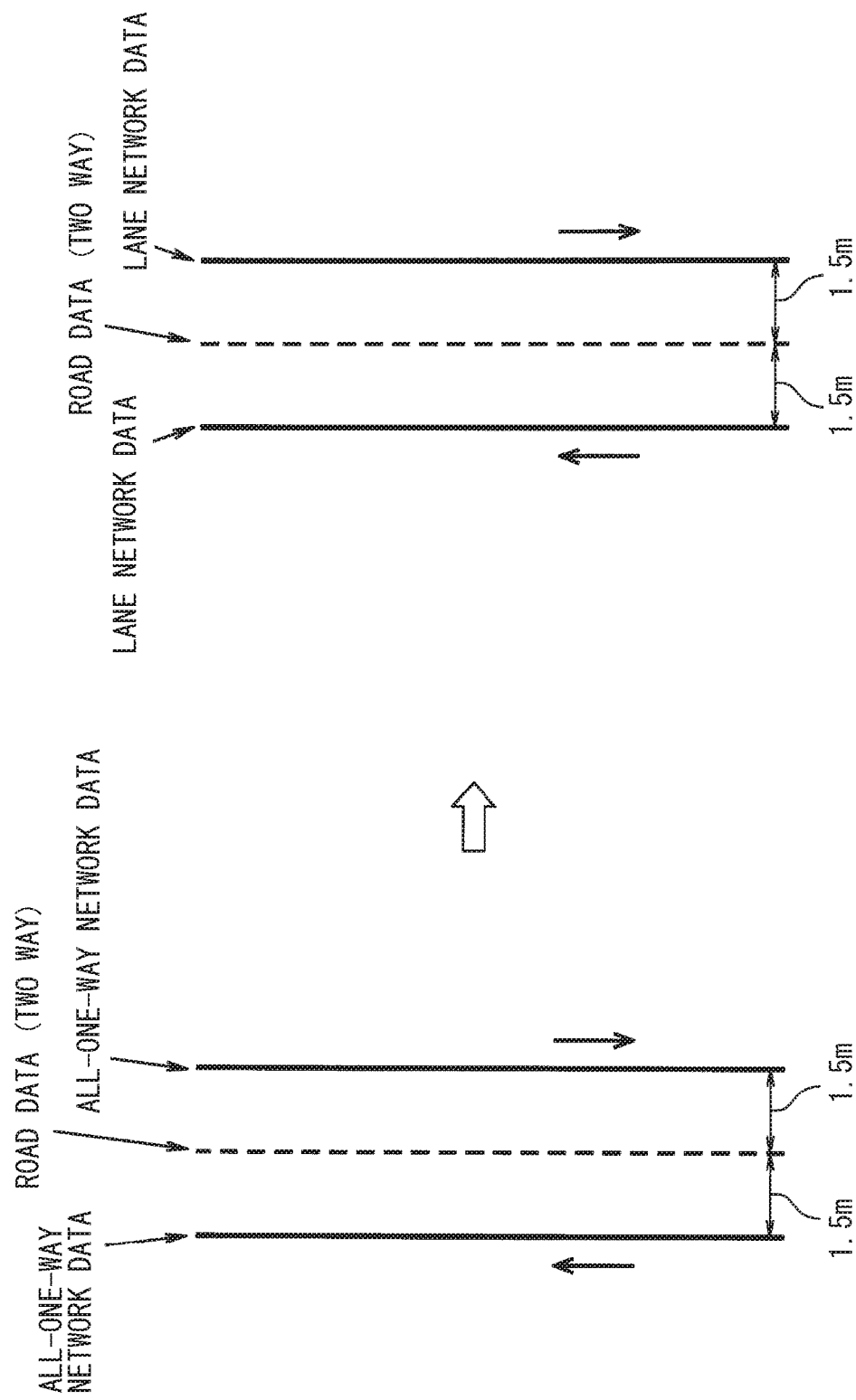
FIG. 8 is a diagram (part 3) illustrating a feature of generating lane network data.
Figure 9:
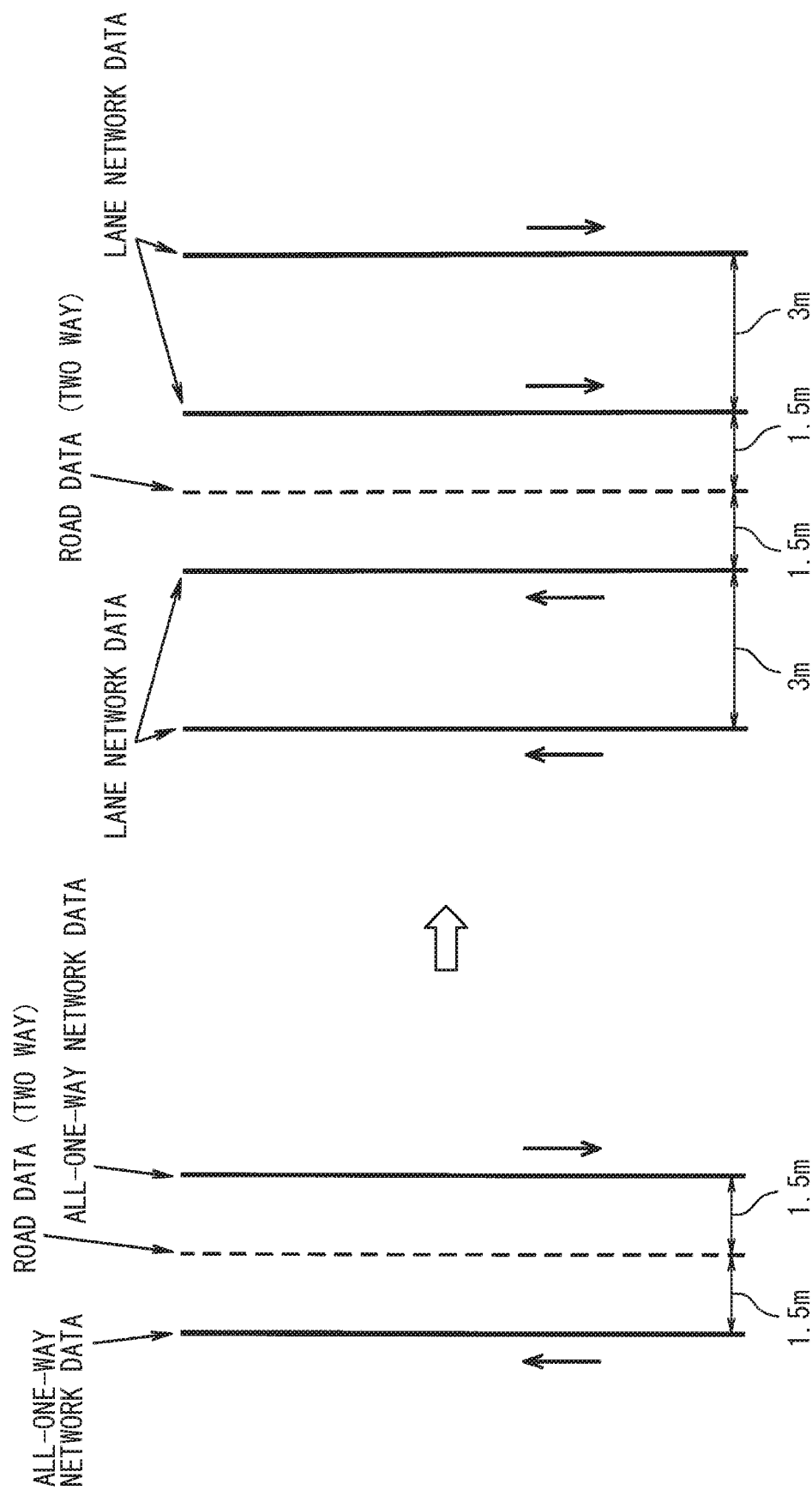
FIG. 9 is a diagram (part 4) illustrating a feature of generating lane network data.
Figure 11:
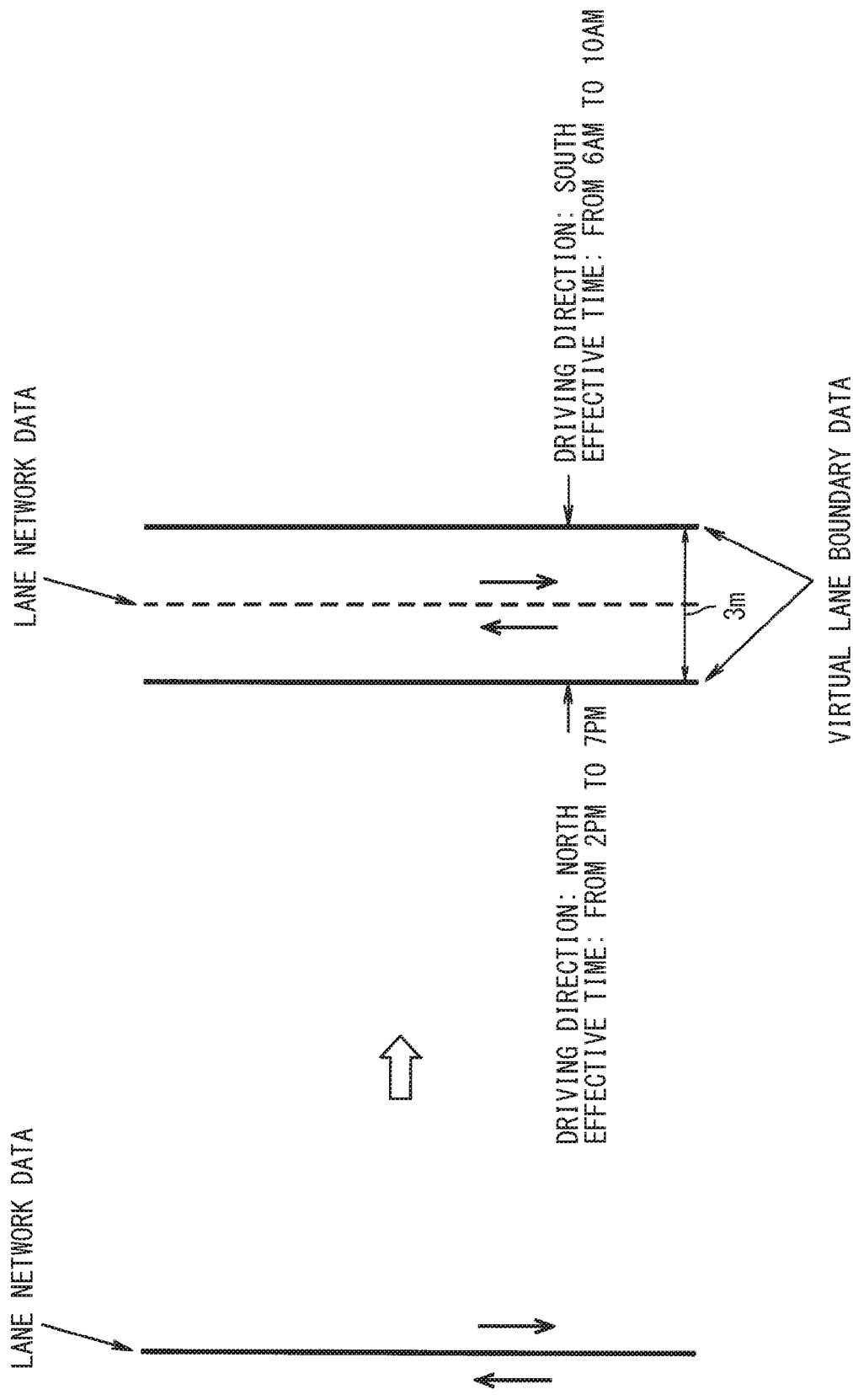
FIG. 11 is a diagram (part 2) illustrating a feature of generating virtual lane boundary data.

When the lane network data generator 3 determines that the original road data indicates two-way traffic and indicates the all-one-way network data obtained by duplicating the road data as shown in FIGS. 8 and 9, the lane network data generator 3 sets the position of the road data at the center and sets the lane network data with a driving direction on the left side with respect to the direction of the road data when a left-hand traffic system is established in an area, and sets the lane network data with a driving direction on the right side with respect to the direction of the road data when a right-hand traffic system is established in an area. When the number of lanes for each direction is "1", the lane network data generator 3 sets the lane network data at the same position as the all-one-way network data for each direction as shown in FIG. 8. When the number of lanes for each direction is "2", the lane network data generator 3 sets the lane network data the same position as the all-one-way network data for each direction and at the position shifted from the all-one-way network data as shown in FIG. 9. Also in this case, the lane network data generator 3 only stores information to which intersection the lane network data is connected. In this case as well, the lane network data generator 3 performs a process of setting the interval between the original road data and each lane of the lane network data to be equal to each other in a case where the original road data indicates the curve section. Also, as shown in FIG. 11, the lane network data generator 3 sets two lines including upper and lower lanes in the lane network data side by side without increasing the distance therebetween when the driving direction of the road changes depending on the time zone.

Figure 10:
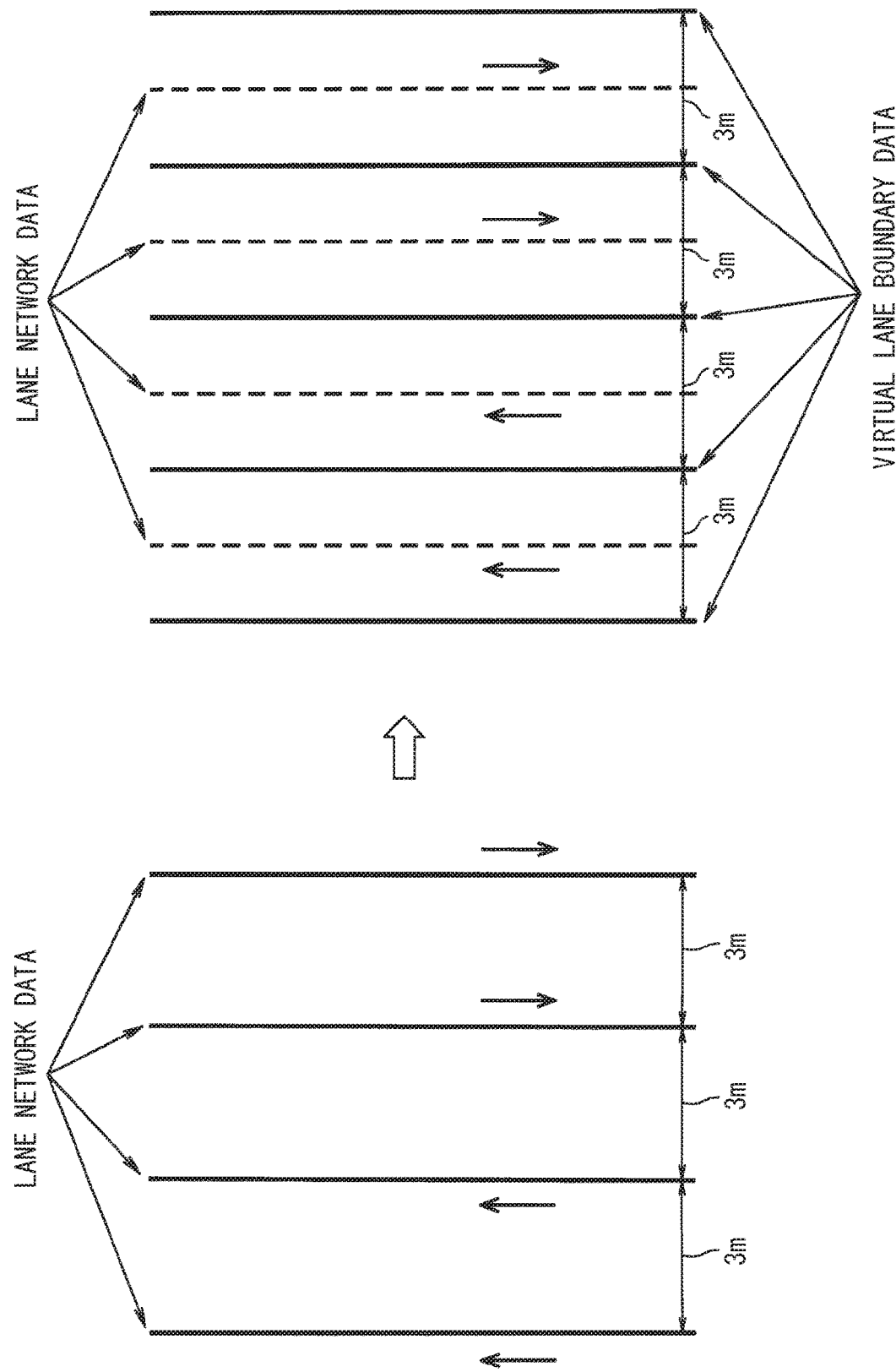
FIG. 10 is a diagram (part 1) illustrating a feature of generating virtual lane boundary data.

Next, the virtual lane boundary data generator 4 generates the virtual lane boundary data from the all-one-way network data using the number-of-lanes information of the road data included in the navigation map data (at S3, corresponding to a virtual lane boundary data generation procedure). That is, as shown in FIG. 10, when the lane network data is arranged at a position shifted by a predetermined distance (for example, 3 meters) as described above, the virtual lane boundary line data generator 4 generates the virtual lane boundary data arranged at a position shifted by a predetermined distance (for example, 1.5 meters) on both left and right sides of the lane network data. In this case as well, the virtual lane boundary data generator 4 performs a process of setting the interval between the original road data and each boundary of the virtual lane boundary data to be equal to each other in a case where the original road data indicates the curve section. Also, as shown in FIG. 11, the virtual lane boundary line data generator 4 sets the virtual lane boundary data at a position shifted by a predetermined distance (for example, 1.5 meters) on both right and left sides of each of two lines of the lane network data arranged side by side without increasing the distance therebetween when the driving direction of the road changes depending on the time zone.

Next, the additional lane data adder 5 adds the additional lane data to the lane network data using the lane type information of the road data included in the navigation map data (at S4, corresponding to the additional lane data adding procedure). That is, for example, in an area where a road traffic system of a left-hand traffic is implemented, when a waiting situation for an oncoming vehicle occurs during a right turn, an additional lane may be disposed as a place where a right-turn vehicle stands by so as not to obstruct the traffic of a vehicle going straight. In the navigation map data, the additional lane data may not be digitized accurately. On the other hand, the information indicating the connection relationship for each lane may be provided for the roads entering into and leaving the intersection as guiding information for turning right and left at the intersection. In some cases, the information may include lane type information indicating whether each lane is a normal lane or an additional lane.

Figure 12:
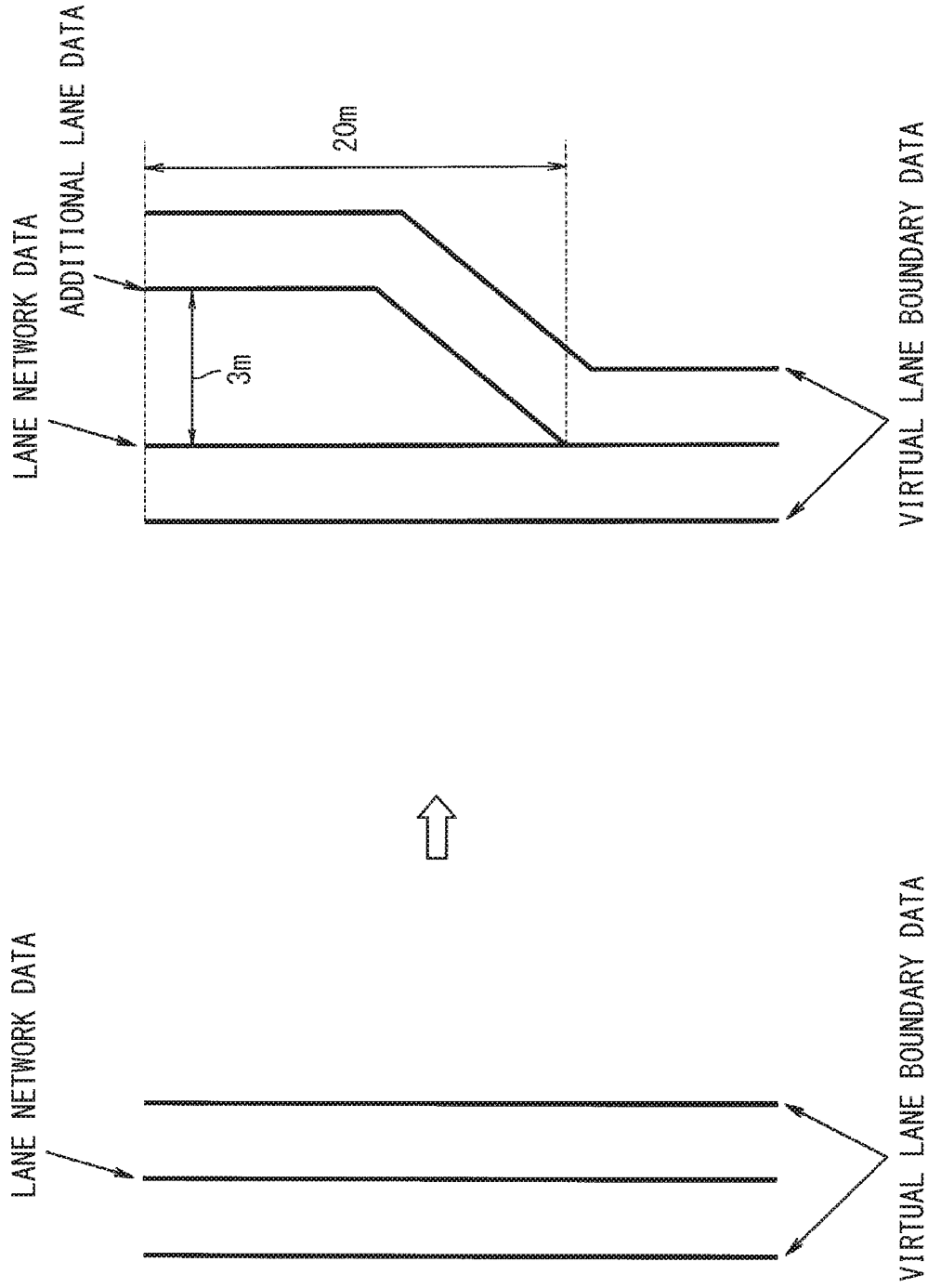
FIG. 12 is a diagram showing a feature of adding additional lane data.

The additional lane data adder 5 determines whether the information includes the additional lane data before the intersection. When determining that the information does not include the additional lane data, the adder 5 does not add the additional lane data. When determining that the information includes the additional lane data, the adder 5 adds the additional lane data. As shown in FIG. 12, the additional lane data adder 5 sets the distance between the lane network data and the additional lane data to be a predetermined distance (for example, 3 meters), and sets a branch point from the original lane network data at a position spaced apart from the end point of the intersection by a distance (for example, 20 meters). When the additional lane data is added and overlaps with the lane network data of the oncoming lane by adding the additional lane data, the additional lane data adder 5 shifts the lane network data of the oncoming lane to a direction for avoiding the overlapping of the lane network data as a whole. When the additional lane data is added to the lane network data, the additional lane data adder 5 reflects information on the added additional lane data on the lane network data, the virtual lane boundary data, and the driving trajectory data within the intersection.

Figure 13:
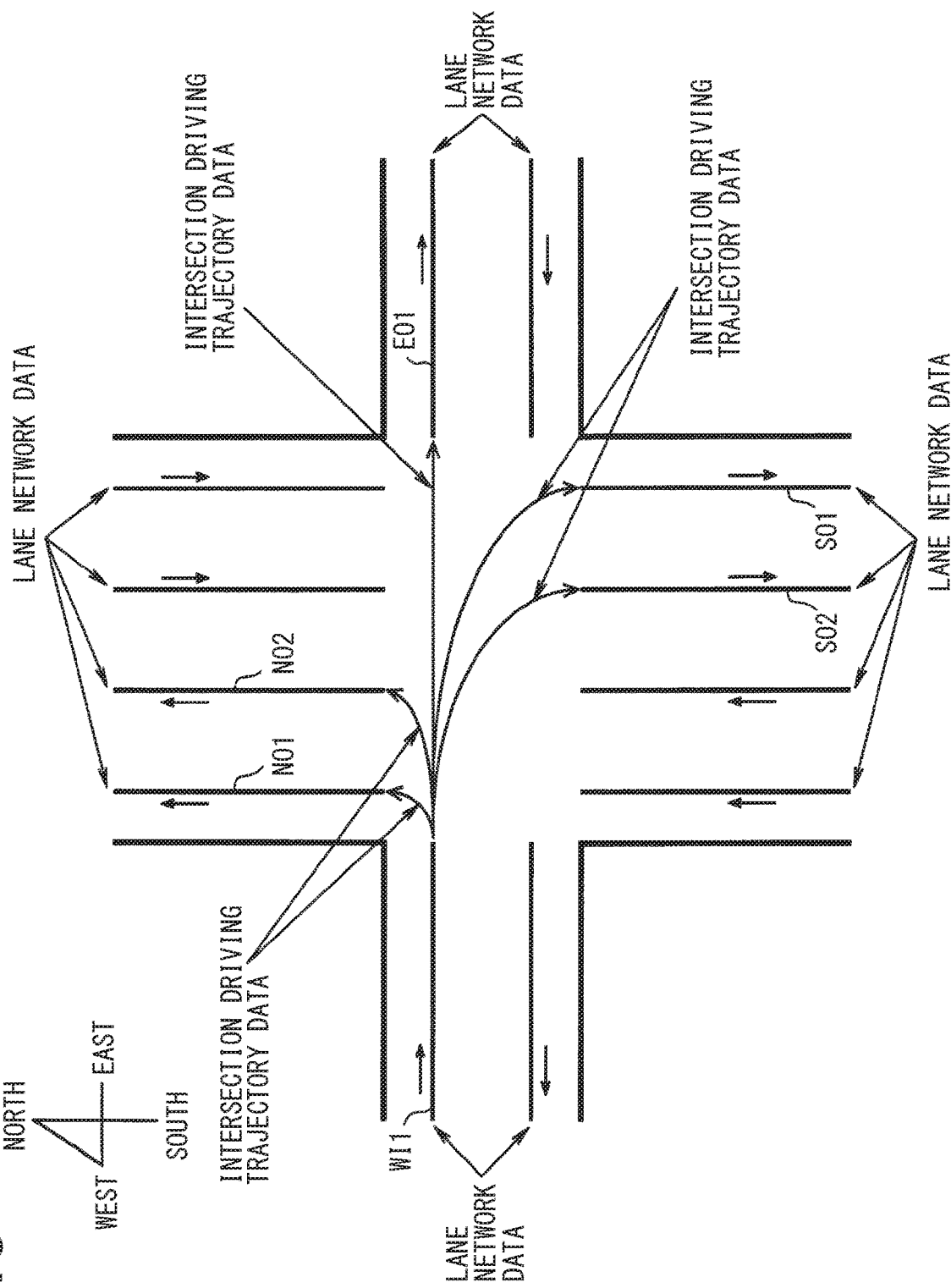
FIG. 13 is a diagram showing a feature of generating driving trajectory data within an intersection.

Next, the intersection driving trajectory data generator 6 generates the intersection driving trajectory data for the lane network data using the intersection connection information of the road data included in the navigation map data (at S5, corresponding to the intersection driving trajectory data generation procedure). That is, in the navigation map data, as the connection relationship for each lane of the intersection, for example, the information of the first lane as the leftmost lane indicates the left turn and going straight, the information of the second lane adjacent to the first lane indicates the going straight, and the information of the third lane adjacent to the second lane indicates the right turn. However, for example, when the road ahead of the left turn includes two lanes, the information does not indicate of which lane the vehicle enters. As shown in FIG. 13, the driving trajectory data generator 6 generates the intersection driving trajectory data from the driving trajectory data for connecting the lane entering the intersection and all lanes ahead of the intersection that may exit the intersection with respect to the entering lane. FIG. 13 shows an example of the intersection driving trajectory data for connecting the lane "WI1" entering the intersection from the west and each of the lanes "NO1" and "NO2" exiting to the north of the intersection, the lane "EO1" exiting to the east of the intersection, and the lanes "SO1" and "SO2" exiting to the south of the intersection. The intersection driving trajectory data generator 6 generates the intersection driving trajectory data for all lanes entering the intersection. When the intersection driving trajectory data generator 6 generates the intersection driving trajectory data for the lane network data, the generator 6 generates the information of the generated intersection driving trajectory data on the lane network data and the virtual lane boundary data.

Figure 14:
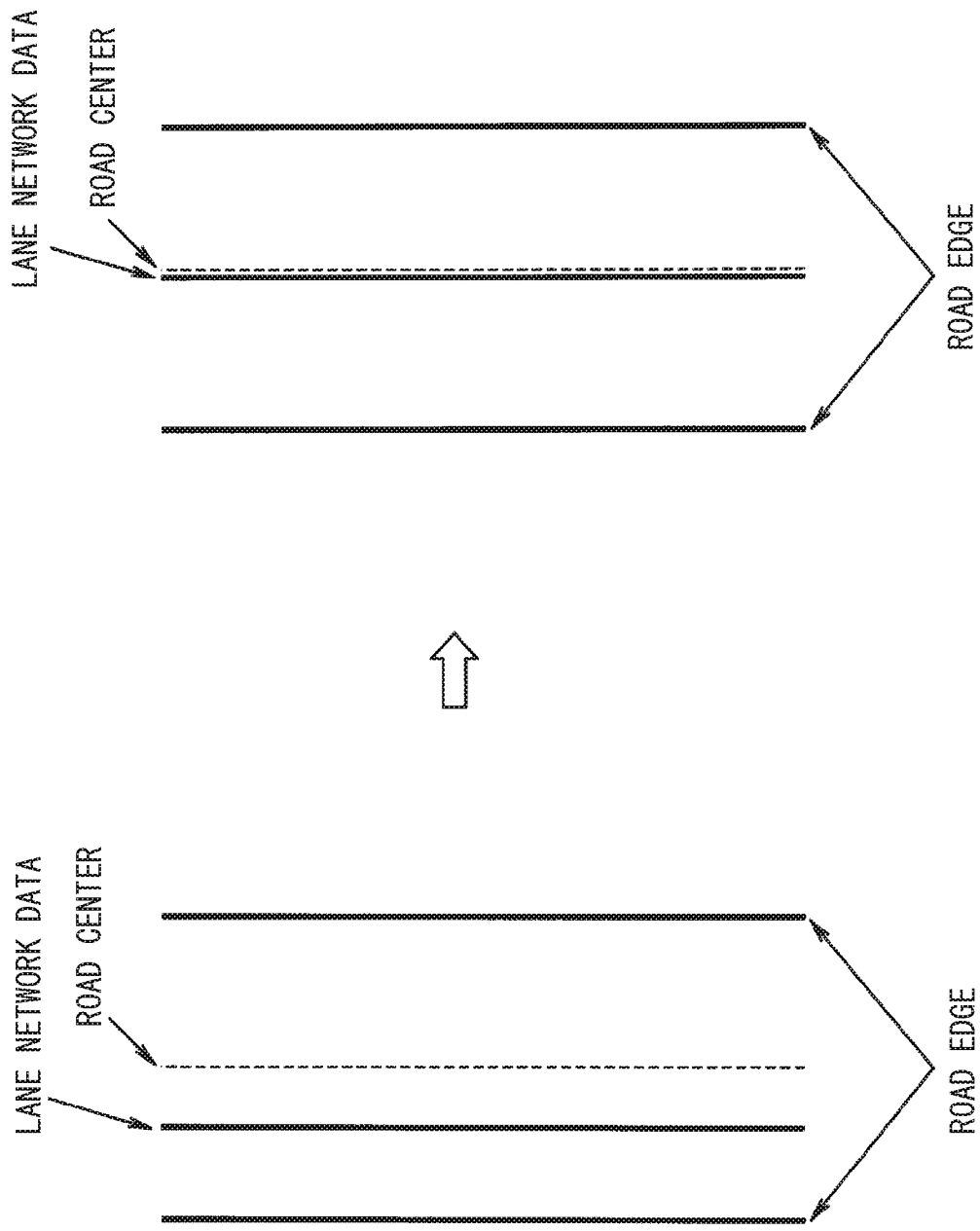
FIG. 14 is a diagram (part 1) illustrating a feature for correcting the position of lane network data.

Next, the first position correction unit 7 corrects the position of the lane network data and the position of the virtual lane boundary data using the road edge information and the road component line information of the basic road map data (at S6, corresponding to the first position correction procedure). That is, the first position correction unit 7 corrects the position by overlaying the lane network data with the road edge information and the road component line information. The advantage of using the basic road map data is that the basic road map data can acquire information that cannot be observed from the sky and is not included in the aerial photograph data. That is, it is possible to acquire information of an underground road or a road shielded by another structure. As shown in FIG. 14, when only one line in the lane network data exists on a road indicated by a road edge or a road constituent line, the first position correction unit 7 corrects the position of the lane network data at the center of the road.

Figure 15:
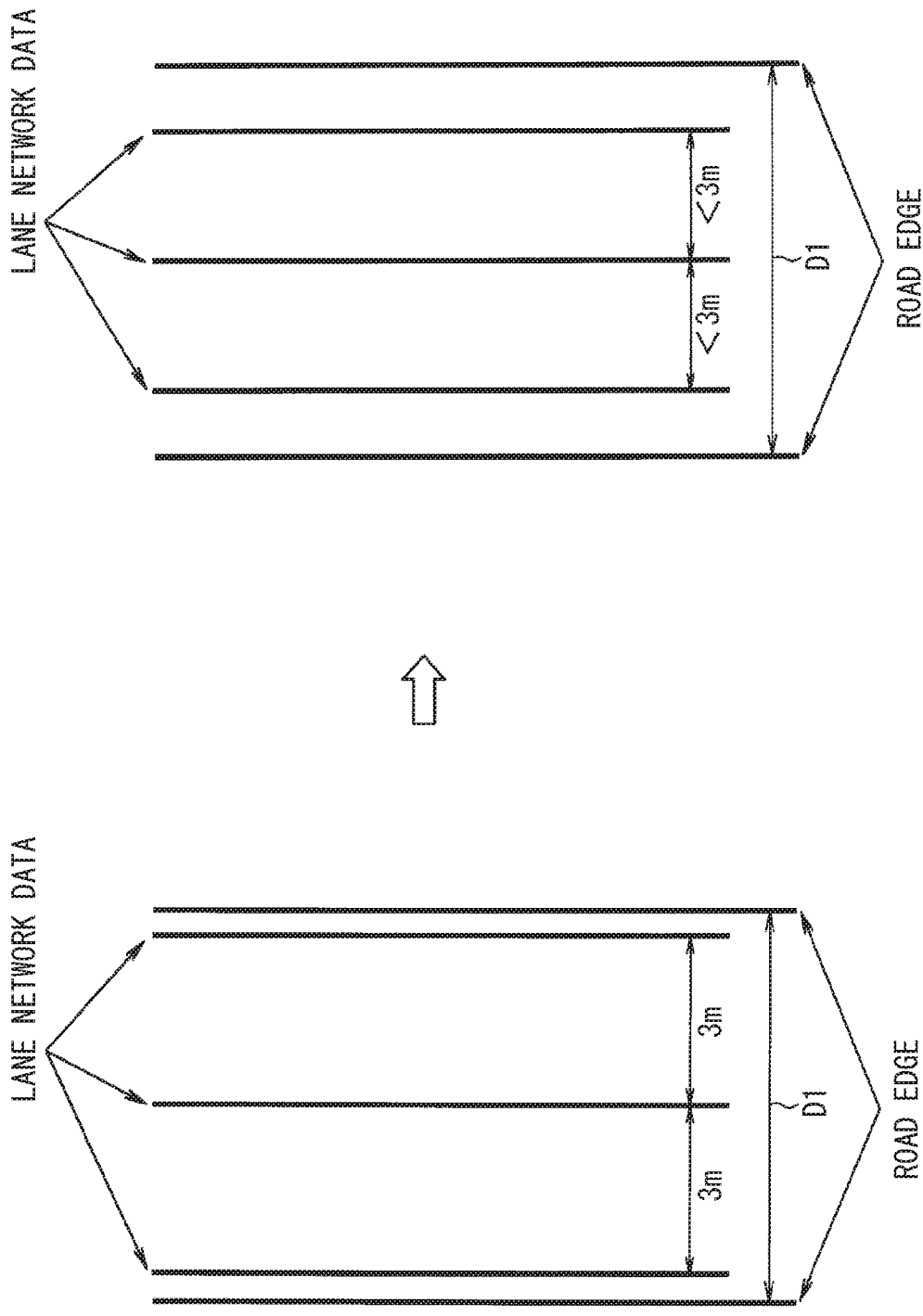
FIG. 15 is a diagram (part 2) illustrating a feature of correcting the position of lane network data.
Figure 16:
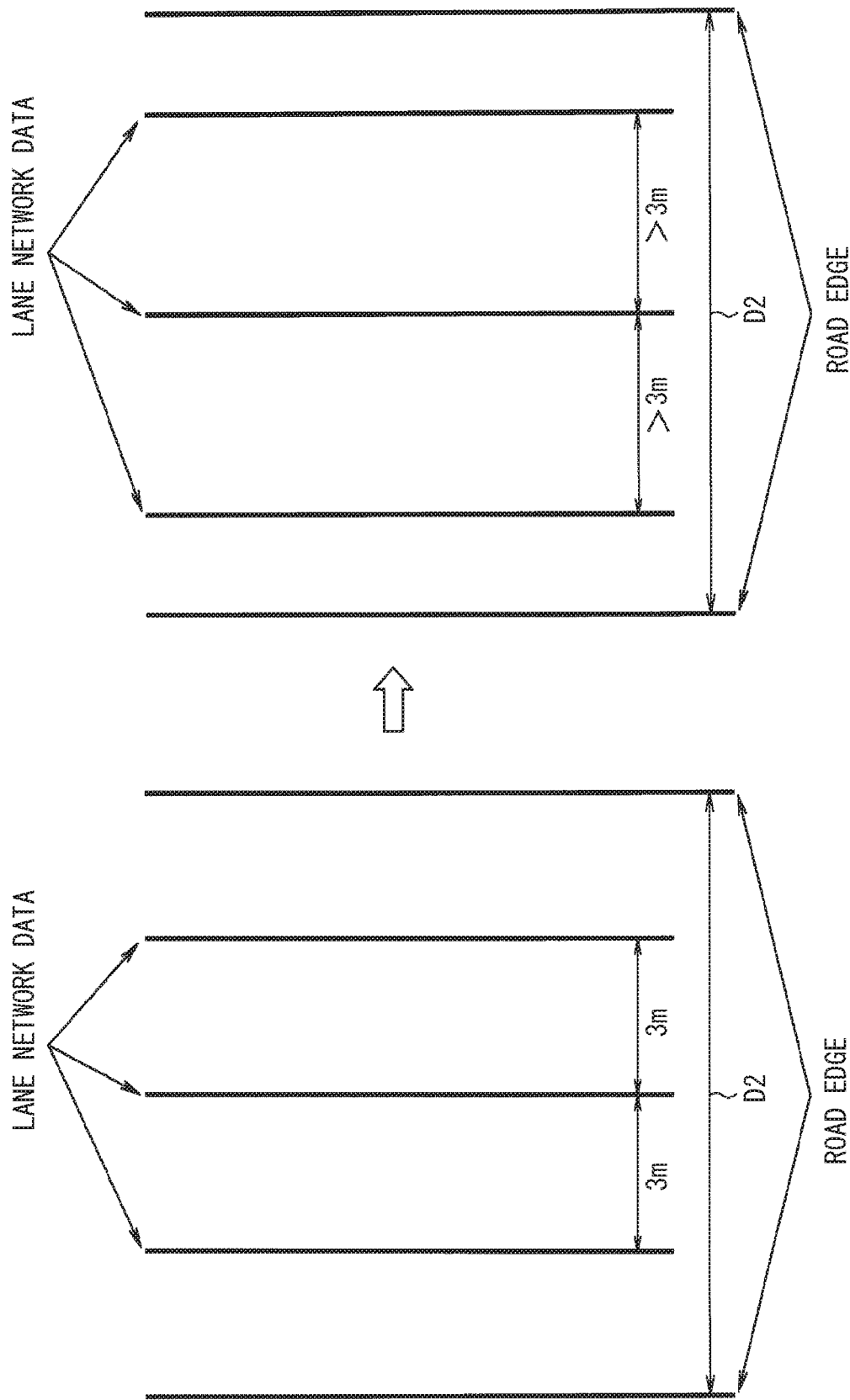
FIG. 16 is a diagram (part 3) illustrating a feature of correcting the position of lane network data.

As shown in FIGS. 15 and 16, when a plurality of lines in the lane network data exists on a road indicated by a road edge or a road configuration line, the first position correction unit 7 divides the width of the road equally into the number of lanes, and corrects the position of the lane network data at the center of each equally-divided lane. That is, as shown in FIG. 15, when the road width is relatively narrow with respect to the number of lines in the lane network data, the first position correction unit 7 corrects the position of the lane network data so as to set the distance between the lines in the lane network data to be narrower than the above-described predetermined distance (for example, 3 meters).

As shown in FIG. 16, when the width of the road is relatively large with respect to the number of lines in the lane network data, the first position correction unit 7 corrects the position of the lane network data so as to set the distance between the lines in the lane network data to be wider than the above-described predetermined distance (for example, 3 meters). In this case, the first position correction unit 7 corrects the position of the lane network data so that the distance between the road edge and the outside line of the lane network data is approximately a half of the distance between lines in the lane network data. When the first position correction unit 7 corrects the position of the lane network data, the unit 7 also corrects the position of the virtual lane boundary data.

Next, the second position correction unit 8 corrects the position of the lane network data and the position of the virtual lane boundary data using the paint information of the aerial photograph data (at S7, corresponding to a second position correction procedure). That is, the second position correction unit 8 corrects the position of the lane network data according to the paint information of the aerial photograph data. The advantage of using aerial photograph data is to obtain information not included in the basic road map data (such as a road center line, a lane boundary line, a road boundary line, a divergence zone, a pedestrian cross walk, a stop line, a traffic direction arrow according to the direction of traffic, etc.).

Since the first position correction unit 7 adjusts the position of the lane network data and the position of the virtual lane boundary data to be closer to the actual positions, the second position corrector 8 can limits an area for extracting information to be recognized from the aerial photograph data. Thus, the process time can be reduced, and the probability of detecting unnecessary information by mistake can be reduced. When recognizing, for example, a lane boundary line, a road boundary line, and a road center line based on the aerial photograph data, the second position correction unit 8 sets the position of the virtual lane boundary line data at the center, and recognizes each line based on the surrounding image. Further, when recognizing the traffic segment arrow for each traffic direction based on the aerial photograph data, the second position correction unit 8 sets the lane network data as the center and recognizes the arrow based on the surrounding image.

The second position correction unit 8 corrects the position of the virtual lane boundary data using the positions of the lane center line, the lane boundary line, the road boundary line, the divergence zone and the like recognized from the aerial photograph data, and corrects the position of the lane network data at the center of each lane sandwiched between the corrected virtual lane boundary line data. When the road does not include the road center line since the width of the road is not sufficiently wide although the road is a two-way road, the lane network data indicates two lines of the upper and lower lines in a single lane. Therefore, as shown in FIG. 17, the second position correction unit 8 sets two lines of the lane network data into the single lane with maintaining a predetermined distance so that vehicles pass each other, and deletes the corresponding virtual lane boundary data.

Further, the second position correction unit 8 corrects the position of the additional lane data from the corrected position of the virtual lane boundary data corrected based on the aerial photograph data. That is, when the width of the road is not enough to arrange a right-turn only lane or a left-turn only lane, the second position correction unit 8 may widen the width of the lane before the intersection and handle the single lane as if it were two lanes in some cases.

In this case, although the road includes the single lane observed from the aerial photograph data, it is necessary to generate the lane network data with separating into two lanes. In such a place, generally, a traffic segment arrow for each traveling direction is displayed in parallel in one lane. When the second position correction unit 8 detects such a place from the aerial photograph data, the unit 8 separates the lane network data into two lanes from the point where the lane is widened, and generates as independent lane network data. Here, when the lane network data and the virtual lane boundary data generated from the road data are not consistent with the lane boundary line, the road boundary line, the divergence zone, the lane center line, and the like recognized from the aerial photograph data, the second position correction unit 8 prioritizes the information recognized from the aerial photograph data, and corrects the lane network data and the virtual lane boundary data.

The lane network data generation apparatus 1 performs the series of processes described above, and ends the lane network data generation process.

The embodiment described above may provide effects as below.

In the lane network data generation apparatus 1, the position of the lane network data and the position of the virtual lane boundary data are corrected using the basic road map data and the aerial photograph data. Different from a conceivable method of correcting the position of the lane network data using only the aerial photograph data, the total width of all lanes is roughly obtained and the width of each lane is roughly estimated using the basic road map data in addition to the aerial photograph data. Thus, the position of the lane network data can be roughly corrected. Further, by using the aerial photograph data, the position of the lane network data can be corrected in detail. By correcting the position of the lane network data using the basic road map data and the aerial photograph data together, it is possible to appropriately generate high-accuracy lane network data for autonomous driving while eliminating the necessity to go to the actual place.

Further, in the lane network data generation apparatus 1, the additional lane data is added to the lane network data using the lane type information of the road data. By adding the additional lane data, it is possible to appropriately generate high-accuracy lane network data for autonomous driving even for the lane temporarily increased before the intersection.

Further, the lane network data generation apparatus 1 generates the intersection driving trajectory data using the intersection connection information of the road data with respect to the lane network data. By generating the intersection driving trajectory data, it is possible to appropriately generate high-accuracy lane network data for autonomous driving even within an intersection.

Although the present disclosure has been described in accordance with the embodiments, it is understood that the present disclosure is not limited to the embodiments and structures. The present disclosure may cover various modification examples and equivalent arrangements. Furthermore, various combinations and formations, and other combinations and formations including one, more than one or less than one element may be included in the scope and the spirit of the present disclosure.

In the lane network data generation apparatus 1, each functional block may be distributed. That is, for example, a part of the functional blocks may be provided in a server different from the lane network data generation apparatus 1, and various types of data may be transmitted and received via a communication system to generate the lane network data or to correct the position of the lane network data.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A system comprising:
a lane network data generation apparatus that generates lane network data for autonomous driving, the lane network data generation apparatus comprising:
a processor, wherein the processor is configured to:
generate all-one-way network data based on traffic information in road data included in navigation map data;
generate the lane network data for autonomous driving based on the all-one-way network data based on a number of lanes in the road data, the lane network data including a trajectory the vehicle follows during autonomous driving;
generate virtual lane boundary data based on the all-one-way network data, the virtual lane boundary data including boundaries for the trajectory; and
correct a position of the trajectory in the lane network data and a position of the boundaries in the virtual lane boundary data based on basic road map data and aerial photograph data;
a server and communication system configured to receive the corrected lane network data and the corrected virtual lane boundary data from the lane network data generation apparatus; and
a plurality of autonomous vehicles configured to receive the corrected lane network data and the corrected virtual lane boundary data from the server and communication system, each autonomous vehicle being configured to perform autonomous driving of the autonomous vehicles based on the corrected lane network data and the corrected virtual lane boundary data.

2. The system recited by claim 1, wherein:
at least one of the generating of the all-one-way network data, the generating of the lane network data for autonomous driving, the generating of the virtual lane boundary data, and the correcting of the position of the trajectory in the lane network data and the position of the boundaries in the virtual lane boundary data is performed in real time.

3. The system according to claim 1,
wherein the processor is further configured to add additional lane data to the lane network data based on lane type information in the road data.

4. The system according to claim 1, wherein the processor is further configured to:
generate intersection driving trajectory data based on intersection connection information with respect to the lane network data.

5. The system according to claim 1, wherein:
the processor is further configured to:
correct the position of the trajectory in the lane network data and the position of the boundaries in the virtual lane boundary data based on road edge information and road component line information in the basic road map data; and
correct the position of the trajectory in the lane network data and the position of the boundaries in the virtual lane boundary data based on paint information in the aerial photograph data.

6. The system of claim 1, wherein
a trajectory that each of the plurality of autonomous vehicles follows during autonomous driving is controlled based on the corrected lane network data and the corrected virtual lane boundary data.

7. The system of claim 1, wherein the processor is further configured to generate the lane network data including the trajectory the vehicle follows during autonomous driving and the virtual lane boundary data including the boundaries for the trajectory with an accuracy higher than a predetermined accuracy for autonomous driving without being physically present at a road to determine the trajectory and the boundaries on the road.

8. The system of claim 1, wherein, a total width of all lanes and a width of each lane is estimated based on the basic road map data to correct the position of the trajectory in the lane network data, and the position of the trajectory in the lane network data is corrected based on the aerial photograph data.

* * * * *